United States Patent
Jantzen et al.

[15] 3,694,093
[45] Sept. 26, 1972

[54] EXPOSURE METER

[72] Inventors: Charles A. Jantzen, 190 Alps Road, Wayne, N.J. 07470; Victor J. Canziani, 1145 E. 21 St., Brooklyn, N.Y. 11210

[22] Filed: Aug. 30, 1971

[21] Appl. No.: 175,838

[52] U.S. Cl. ............... 356/226, 95/10 C, 356/224, 356/228
[51] Int. Cl. ............... G01j 1/44, G01j 1/42
[58] Field of Search ...... 356/218, 223, 224, 225, 226, 356/227, 228; 95/10 C

[56] References Cited

UNITED STATES PATENTS 2,703,035 3/1955 Tobler ................. 356/226

Primary Examiner—Ronald L. Wibert
Assistant Examiner—V. P. McGraw
Attorney—Robert E. Isner et al.

[57] ABSTRACT

An exposure meter which includes a Wheatstone Bridge circuit having first and second house sides. One house side includes a photoconductive cell and a plurality of resistors which can be selectively and individually connected in series with the photoconductive cell at any of a series of illumination values of light incident thereon so that the normally nonlinear relationship between the resistance of a photo conductive cell and the illumination of light incident thereon can be converted to a useable relationship for that specific series. The second house side includes a resistance size (increasing $f$/stop number) as the ladder is climbed, and two pairs of resistance ladders, one pair representing the increasing camera speed (FPS or frames per second) as the ladders are climbed and one pair representing the increasing film sensitivity (ASA rating) as the ladders are climbed. The individual ladders of each pair are identical, have a preselected number of steps and are conjointly set to the same setting or position so that when one ladder of each pair is interconnected and each so connected pair is respectively connected to the top or bottom of the first resistance ladder a constant total resistance will be maintained, for all possible settings, on the second house side. The Bridge can be standardized so that the photoconductive cell can be calibrated and compensated for any deviation from a standard set of resistance values for the specific illumination series. Also provided is means for multiplying each of the camera speed (FPS) setting by a predetermined multiple so that a wide range of FPS settings can be conveniently provided.

8 Claims, 5 Drawing Figures

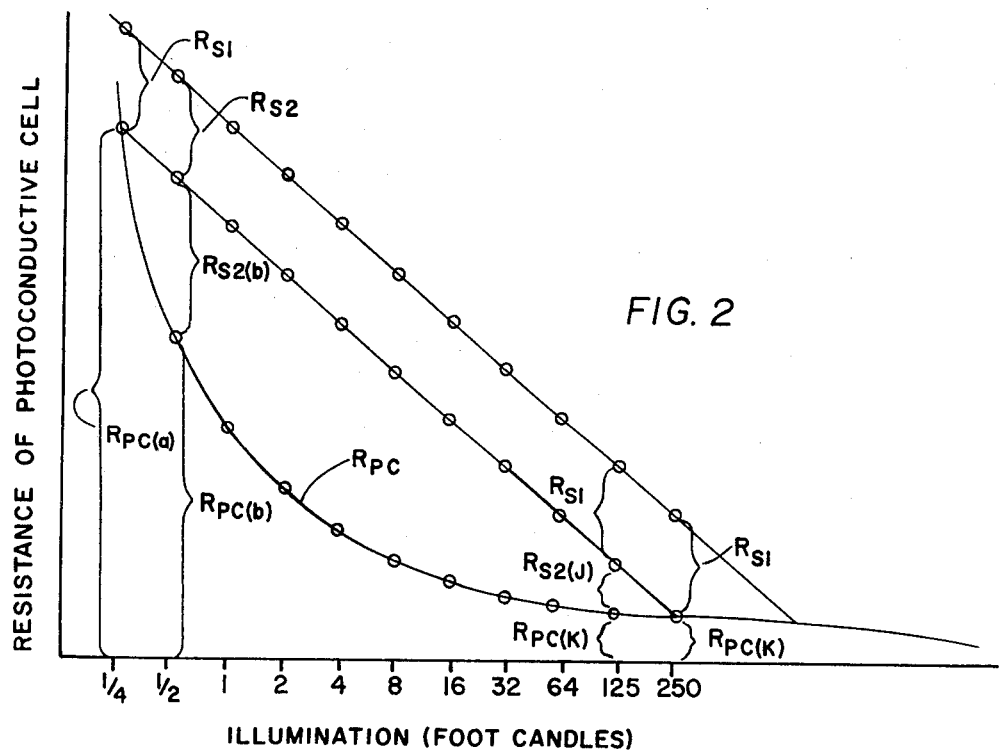
FIG. 2
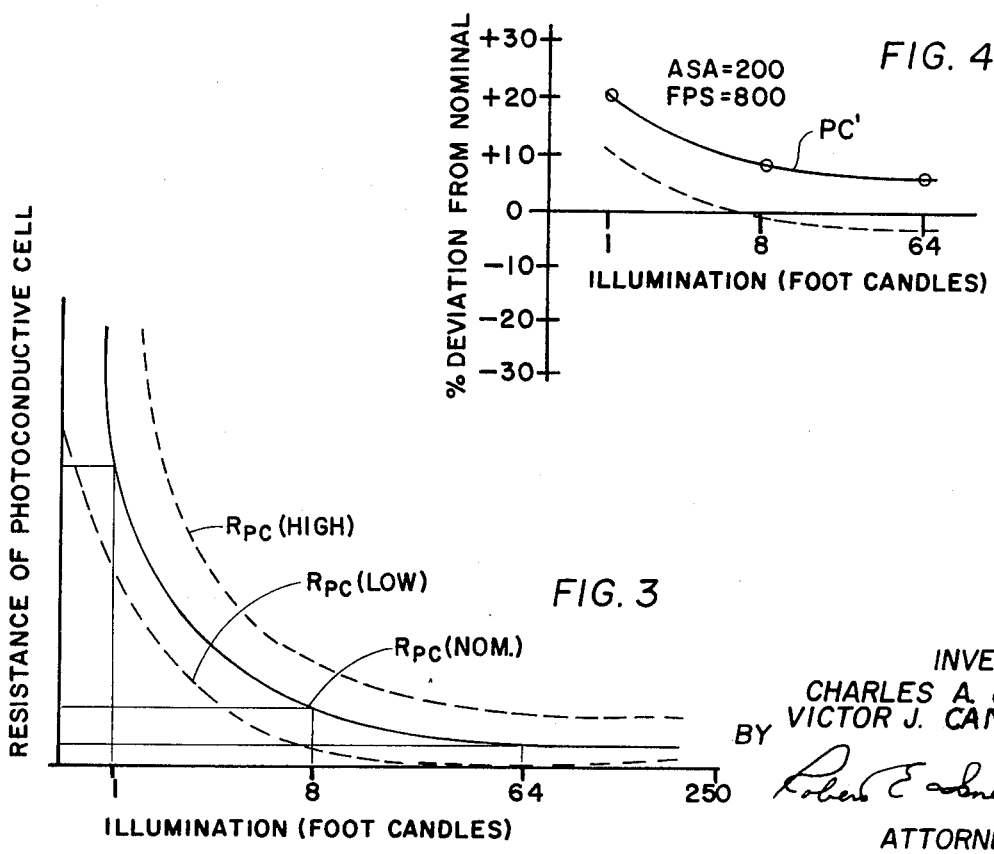
FIG. 4
FIG. 3
INVENTOR
CHARLES A. JANTZEN
VICTOR J. CANZIANI
BY
ATTORNEYS

EXPOSURE METER

The present invention relates to exposure meters and more particularly to exposure meters specifically intended for use with high speed rotating prism cameras, but is adaptable to almost any photographic camera.

When motion photographs are taken it is essential to good photography that a satisfactory adjustment be attained amongst the four principal control parameters, i.e., light, film speed, camera exposure time and diaphragm opening.

Traditionally, personal experience is the keystone for determining the above referred to satisfactory adjustment of the four principal control parameters and as a result, on occasion, even the most experienced photographer will misjudge a given situation and the exposure of the developed film will not be satisfactory.

With the complexity and sophistication of experiments, investigations, studies or recording relying on movie camera apparatus to make a permanent analyzable record thereof, increasing with the concomitant increase in cost for such experiments and the like it becomes most desirable for these experiments to be properly recorded the first time.

It is accordingly the principal objective of the present invention to provide an exposure meter for determining when a good combination of the above control parameters has been achieved whereby the possible error due to human judgment can be minimized.

It is a further objective of the present invention to provide an exposure meter wherein a given photoconductive cell can be calibrated in order that a high degree of accuracy can be achieved.

It is another objective of the present invention to provide such an exposure meter wherein the calibration of the exposure meter can be quickly and accurately checked.

Among the advantages of the present invention is the provision of an exposure meter wherein several suitable combinations of the basic four parameters can be defined whereby the most satisfactory solution can be utilized.

Other objectives and advantages of the present invention will become apparent from the following portion of this specification and from the accompanying drawings which illustrate in accord with the mandate of the patent statutes a presently preferred embodiment incorporating the principles of the invention.

Referring to the drawings:

FIG. 2 is a graphical representation of the relationship between the resistance of a conventional photoconductive cell and the illumination of light incident thereon.

FIG. 3 is a graphical representation similar to that of FIG. 2 additionally illustrating the same relationship between photoconductive cells which have a deviation from the standard photoconductive cell over the normal operating range.

FIG. 4 is a graphical representation of a deviation curve for a photoconductive cell.

Figure 1A:
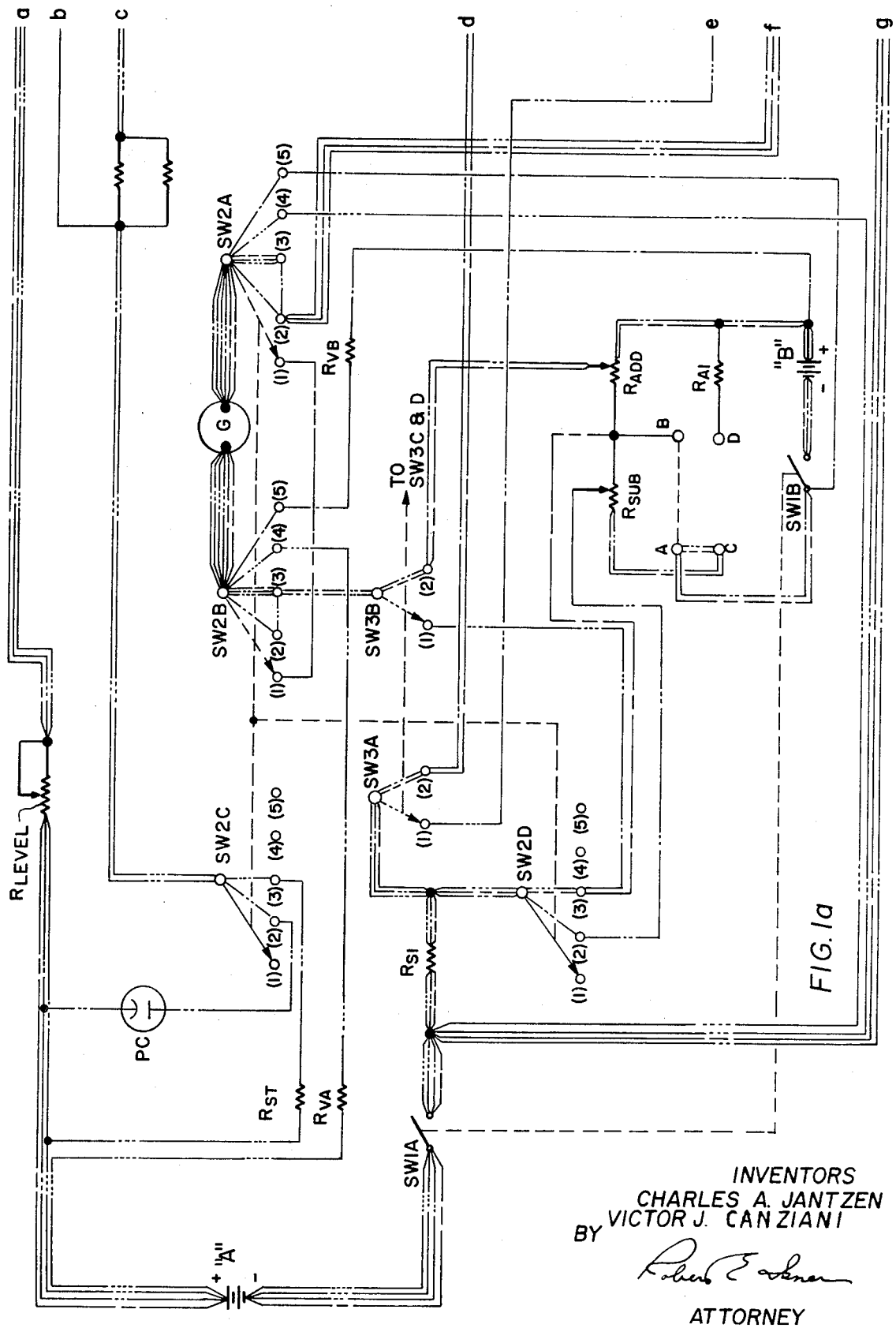
FIGS. 1a and 1b are a circuit diagram of the exposure-meter of the present invention.
Figure 1B:
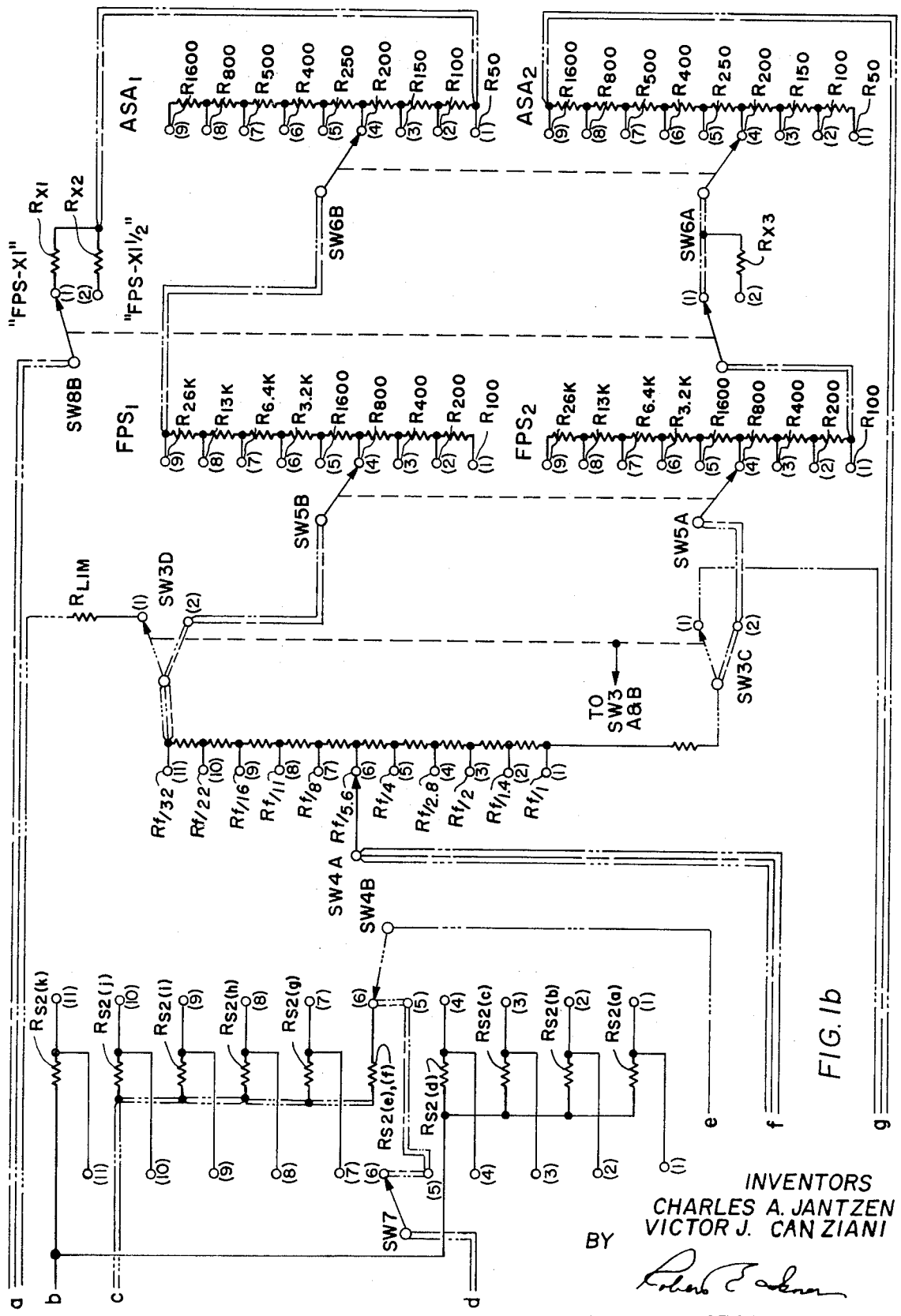

The circuit diagram for the presently preferred embodiment of the exposure meter is illustrated in FIG. 1 and the invention will be described with specific reference to the individual circuits thereof.

LINEARIZATION CIRCUIT

The basic circuit for the exposure meter is a Wheatstone Bridge which includes first and second arms connected at their common ends to a source of constant voltage A. The first arm, which includes several known, fixed resistances of appropriate values plus the photoconductive cell, defines one side of the house. The second arm, which includes first and second resistances or more resistances which can be varied through a predetermined range and through which a constant current flows, defines the second house side.

One of the known and fixed resistances of the first arm is a resistor $R_{s1}$ across which resistance are developed signal voltages in proportion to the illumination incident on the photoconductive cell and which signals are inserted from the left house side into the Bridge for analysis. Another one of the resistances of the first arm is a photoconductive cell PC which preferably is to be positioned at the focal plane of a camera to sense the amount of light incident thereon.

The resistance of a photoconductive cell varies non-linearly with illumination. An illustrative curve of resistance $R_{pc}$ versus illumination for a particular type of photoconductive cell is illustrated in FIG. 2.

In order that a proportional relationship exists between the intensity of the light incident on the photoconductive cell and the current allowed to flow through the first arm of the bridge for a predetermined series of conventional illumination levels, for example: a footcandle series ($a=¼$), ($b=½$), ($c=1$), ($d=2$), ($3=4$), ($f=8$), ($g=16$), ($h=32$), ($i=64$), ($j=125$), ($K=250$), a resistor $R_{s2(a)},..., R_{s2(k)}$ having a selected value is added to the resistance of the photoconductive cell at each of the above ratings in addition to a fixed resistance of $R_{s1}$ continuously employed with the photoconductive cell and $R_{s2}$.

In the preferred embodiment illustrated in FIG. 1, each of these resistors $R_{s2}$ may be selectively and individually connected in series with the photoconductive cell by means of suitable switches SW4B and SW7.

OPERATING CIRCUIT

The second arm of the basic Wheatstone Bridge circuit includes a ladder of resistors D having a number of steps (which may be equal) or resistors $R_{f1.0}, ..., R_{f32}$ equal to the number of and corresponding to respective resistors $R_{s2(a)}, ..., R_{s2(k)}$ of the linearizing circuit and representing the diminishment of the diaphragm opening, a pair of identical resistor ladders $FPS_1$, $FPS_2$ each having a plurality of identical resistors $R_{100}, R_{200} ... R_{26k}$ representing the increase in the camera speed (FPS) and a pair of identical resistor ladders $ASA_1$, $ASA_2$ having a series of resistors $R_{50}, ..., R_{1600}$ representing the increasing sensitivity of film as the ASA rating progresses along a conventional rating sequence.

The setting of diaphragm/light switch SW4A to a specific setting, as for example at the $f/5.6$ setting or number 6 position, determines the location on the second house side where the null meter joins the second arm. The setting of frames per second (FPS) switch SW5B, which is set conjointly with similar switch SW5A, defines the desired setting for the frames per second or camera speed, and the setting or film speed switch SW6B, which is set conjointly with similar switch SW6A, defines the desired setting for the film speed (ASA).

As can be appreciated by the utilization of pairs of identical ladders for representing camera speed and film speed, by switching each ladder of a given pair in an identical manner, and by defining upper and lower resistances which complementally represent the total resistance of an individual ladder of the pair, the total resistance of the second arm from the positive side of the battery A to the negative side of the battery A will always be constant, and accordingly the current flowing through the second arm will be constant for all possible settings.

Prior to operating the exposure meter the subject, camera, accessories, lights and lens (all not shown) are readied in the usual manner. The camera lens is focused with the diaphragm wide open at the largest $f$/stop setting and the photoconductive cell is preferably positioned at the focal plane of the camera so as to read the light as the film in the camera sees it.

The exposure meter is then operated by setting the conjointly operable function switches SW2A, SW2B, SW2C, SW2D to operate or position number 2, setting the conjointly operable mode switches SW3A, SW3B, SW3C, SW3D to exposure or position number 2, setting the conjointly operable film speed switches SW6A, SW6B to the ASA rating of the film to be used (or nearest position), setting the conjointly operable frames per second switches SW5A, SW5B to the desired frames per second camera speed (or nearest position) while setting the frames per second multiplying switches SW8A, SW8B conjointly to position 1 and setting the diaphragm/light switch SW4A to the f/stop position nearest to the natural aperture of the camera. Balance switch SW7 is then set at the step corresponding to the step at which switch SW4A is set. Actuate switches SW1A and SW1B are now conjointly actuated, and if the reading of the galvanometer or null-indicating meter is as close to zero as is practicable, a good combination of the four variables (light, film speed, frames per second and $f$/stop) is indicated.

Should the null meter read positive or to the right of zero, excessive light is indicated. Accordingly, several adjustments either individually or in combination can be made, such as: the setting of diaphragm of the camera objective lens can be adjusted to a smaller $f$/stop, less light can be put on the subject, film with a lower ASA rating can be utilized or a higher camera speed can be selected. Adjustments are thus effected until the null meter reads as close to zero as is practicable.

On the other hand, should the null meter read negative (to the left of zero) insufficient light is indicated and accordingly either more light can be put on the subject or a film with a higher ASA rating can be utilized or a lower camera speed can be selected. Adjustments are thus effected until the null meter reads as close to zero as is practicable.

The photoconductive cell is then removed from the camera and the camera can be operated with film of the indicated ASA rating, at the indicated diaphragm opening and at the indicated frames per second.

As previously noted the nonlinear output of the photoconductive cell was linearized. This was done since it would be an extremely complex matter to balance the Wheatstone Bridge since the variation of the diaphragm, FPS and ASA ladders would have to be matched not only to the nonlinear variations of the photoconductive cell but to each other as well.

STANDARDIZING CIRCUIT

In order to attain extremely accurate results the actual resistance $R_{pc'}$, $R_{pc''}$ curve of any photoconductive cell $pc'$, $pc''$ should trace, as closely as possible, the nominal curve $R_{pc}$ illustrated in FIG. 2. To this end the right side of the house is standardized to a known standard, the left side of the house is step-standardized and including a photoconductive cell is calibrated to determine whether and to what extent the actual curve for the photoconductive cell varies from the nominal curve, and the left side of the house is suitably compensated so as to conform, as best as possible, the actual to the nominal curve.

Jumper connectors A, B, C, D provide circuits availability and capability in the left side of the house for calibration compensations. Initially, and until later calibrations indicate otherwise, jumper connectors A, B are joined to produce a closed circuit for a nominal curve photoconductive cell and to complete internal circuitry of the exposure meter for operation.

To standardize the second house side to a known standard, a Wheatstone Bridge Circuit is established by switching function switches SW2A, SW2B, SW2C, SW2D to their number 3 positions, by switching mode switches SW3A, SW3B, SW3C, SW3D to their number one or light positions, whereby a standard resistor $R_{1im}$ which is equivalent to the total of the constant resistance of the complemental FPS and ASA ladder flow paths and the resistance of a multiplying circuit resistor $R_{x1}$, is switched into the circuit of the right house side in place of the FPS and ASA ladders and the multiplying circuit.

The photoconductive cell is now replaced by a resistor whose resistance is equal to the stated resistance of the photoconductive cell at a given illumination (8 foot-candles) and the corresponding linearizing resistance $R_{s2(l)}$ is placed in series therewith by thy selective positioning of diaphragm/light switch to the 8 foot-candles setting, which positioning also admits the D ladder selective point of switch SW4A for the null meter.

Thus the configuration of both sides of the house in both arms of the Bridge are selectively arranged to permit standardization to be performed.

The primary battery A is actuated by closing actuate switch SW1A and the right side of the house is standardized to the left side by adjusting a variable resistor $R_{level}$, which may be in the form of a potentiometer or rheostat, until the null meter is nulled.

Such standardization is performed with the exposure meter attuned in the light mode as a light-measuring meter.

STEP-STANDARDIZING CIRCUIT

After the second side of the house has been standardized as above, only then can the first side of the house be step-standardized by adjusting its step circuit.

To step-standardize the first side of the house, the standard resistor $R_{tim}$ is switched out and the complemental FPS and ASA flow paths and the resistance of a multiplying circuit resistor $R_{x1}$ are switched into the circuit of the right house side. Function switches SW2A, SW2B, SW3C, SW2D are switched to their number 3 positions, mode switches SW3A, SW3B, SW3C, SW3D are switched to their number 2 or exposure positions, multiplying switches SW8A, SW8B are switched to position one, diaphragm/light switch SW4A, balance switch SW7, the frames per second switches SW5A, SW5B and the film speed switches SW6A, SW6B are switched to standard settings, for example:

f5.6, 8, 800 fps, 200 ASA respectively.

The photoconductive cell is now replaced by the same resistor, which served in standardizing the right house side, and the same corresponding linearizing resistance $R_{s2(l)}$ is placed in series therewith by the selective positioning of the balance switch to the 8 foot-candle setting. Positioning of switch SW4A admits the D ladder selective point for the null meter.

Concurrently by the positioning of switches SW2D and SW3B, anpotentiometer $R_{add}$ is entered into the circuits of the left house side.

Thus the configurations of both sides of the house in both arms of the Bridge are selectively arranged to permit step-standardization to be performed.

The secondary battery B is actuated by closing actuate switch SW1B, which closes conjointly with switch SW1A, and the left side of the house is step-standardized to the right side, which had to be previously standardized, by adjusting potentiometer $R_{add}$ until the null meter is nulled.

Such step-standardization is performed with the exposure meter attuned in the exposure mode, and its success is dependent upon prior successful standardization being performed.

CALIBRATING CIRCUIT

Standard photoconductive cells may have a substantial deviation from their stated nominal values. The solid line identified $R_{pc(nom)}$ (FIG. 3) represents the nominal or standard curve representing the relationship between the illumination sensed by the photoconductive cell and the resistance of the photoconductive cell whereas the dotted lines $R_{pc(high)}$, $R_{pc(low)}$ represent illustrative maximum and minimum deviation curves for such a photoconductive cell.

To determine whether and to what extent a given photoconductive cell deviates from the standard curve illustrated in FIG. 3, function switches SW2A, SW2B, SW2C, SW2D are switched to position number 2, mode switches SW3A, SW3B, SW3C, SW3D are switched to position two, FPS switches SW5A, SW5B are switched to standard setting number 4 (800 FPS), ASA switches SW6A, SW6B are switched to standard setting number 4 (200 ASA), multiplier switches SW8A, SW8B are switched to position one and balance switch SW7 and diaphragm switch SW4A are systematically and concurrently switched from position one to position 11 as sources of known illumination corresponding to the setting of switch SW7 are positioned adjacent to the photoconductive cell whereby the positive or negative deviation from null for the photoconductive cell will be indicated on the null meter. (Alternate means of evaluating positive or negative deviation from null as indicated on the null meter for the photoconductive cell may be used by switching mode switches SW3A, SW3B, SW3C, SW3D to position one and conjointly switching switches SW4A, SW4B systematically from position one to position 11 as sources of known illumination corresponding to the setting of switch SW4B are positioned adjacent to the photoconductive cell.)

An illustrated graph of the deviation of a specific photoconductive cell at constant ASA and FPS ratings (200 ASA, 800 FPS) is illustrated in FIG. 4. To minimize the error inherent in the utilization of the given photoconductive cell, the curve is effectively shifted by effectively lowering this graph $R_{pc(dev)}$ by a selected amount, by designed means of circuit applications and controls available by design within the exposure meter at given reference illuminations so that within reasonable limits the effective graph will approach or straddle the nominal curve with a minimum positive and negative deviation.

This compensation can be effected by utilization of a compensating circuit 20. This circuit includes a secondary voltage source B, variable resistors $R_{pc(sub)}$, $R_{add}$, which may be potentiometers, standard resistor $R_{al}$ and jumper connectors A, B, C, D. To effectively reduce the resistance of the photoconductive cell and hence effectively the resistance of the first arm, jumper connectors A and D are joined, jumper connectors A, B are disjoined and potentiometer $R_{pc(sub)}$ is adjusted with the diaphragm/light and balance switches set to the illumination setting by placing a predetermined additive or positive voltage step in series with the first house side. When it is ascertained that calibration of a photoconductive cell requires the joining of jumper connectors A and D, step-standardization must be performed again to compensate its adjustment for the joined jumper connectors A, D circuit configuration, and the final calibration of the photoconductive cell then is made by adjusting variable resistor $R_{pc(sub)}$. To effectively increase the resistance of the photoconductive cell, jumper connectors A and B are joined, jumper connectors C and D are joined, jumper connectors A, D are disjoined if joined and potentiometer $R_{pc(sub)}$ is adjusted with the diaphragm/light and balance switches set to the illumination setting by placing a predetermined subtractive or negative voltage step in series with the first house side. If the actual photoconductive cell curve effectively follows the standard or nominal curve, no compensation is required and only jumper connectors A and B are joined.

To ascertain whether the once calibrated meter has gone out of adjustment, the standardization circuit may be re-established at any time to determine whether the once established standardization has remained unchanged (null meter reading at or near zero) and then the step-standardization circuit can be re-established with the FPS ladders $FPS_1$, $FRS_2$, the ASA ladders $ASA_1$, $ASA_2$ and the diaphragm opening ladder D and optional FPS multiplier set to the above referred to standard settings to determine whether the once established equality between the first and second house sides has remained unchanged (null meter reading at or near zero). If the system has gone out of adjustment the above procedures for standardizing, step-standardizing, calibrating and compensating the exposure meter will be readily repeated.

To increase each FPS setting by 1½ times a multiplier 30 is provided. Switching the multiplier switches SW8A, SW8B to position number two will increase each FPS setting 1½ times. Such a multiplier enables the exposure meter to have a broad FPS range with small increments. The multiplier needs not be limited to 1½ times but may be established at other multiplier levels by judicious use of appropriate values for the multiplier resistors.

To use the apparatus as a light meter for light levels up to 250-foot candles at the camera focal-plane, mode switches SW3A, SW3B, SW3C, SW3D are set to light or number one position and diaphragm/light switch SW4A is adjusted until the null meter is nulled. The foot-candle reading of the diaphragm/light switch will then indicate the light level.

BATTERY CHECK - BATTERY A

A first battery A provides a source of constant voltage for a Wheatstone Bridge circuit and a cheking circuit for this battery is defined by switching actuate switch SW1A to the closed position and by switching function switches SW2A, SW2B to their number four positions. The checking circuit includes the null meter G, a resistor $R_{va}$ and the voltage source A. The resistance of the resistor is selectively chosen so that if the voltage source is developing a voltage within its normal operating range the null meter will register a current flow within a selected range indicated by the null meter.

BATTERY CHECK - BATTERY B

A second voltage source in the form of a battery B is connected to a compensating circuit which will be subsequently discussed in detail. The circuit for checking the output of the second voltage source B is defined by switching actuate switch SW1B, which is switched conjointly with actuate switch SW1A, to closed position and by switching function switches SW2A, SW2B to their number five positions. This checking circuit includes the null meter G and a resistor $R_{vb}$ of selected value and the voltage source B. When the voltage source B is developing a voltage within a predetermined range the null meter will register a current reading within a selected range thereby providing a check on this battery.

PROTECTIVE CIRCUIT

To protect the galvanometer or null meter during transit and non-use a protective circuit can be established by switching function switches SW2A, SW2B to position number 1 whereby the galvanometer will be completely isolated and shunt dampened.

Having thus described our invention, we claim:

1. An exposure meter comprising Wheatstone Bridge circuit means including first and second house sides, a voltage source and a galvonometer,
   said first house side including
   a photoconductive cell having a resistance which varies non-linearly with the illumination of light incident thereon,
   means for linearizing the relationship between the resistance of said photoconductive cell and the illumination of light incident thereon for a preselected series of footcandle valves,
   resistance means for developing signal voltages for the Bridge in proportion to the illumination incident on said photoconductive cell,
   said second house side including
   a first resistance ladder having a plurality of resistive steps representing the size of the diaphragm opening in a camera for a selected series of diaphragm openings,
   connecting means for selectively connecting one side of said galvanometer to said first ladder at any selected step thereof whereby first upper and lower resistances are defined,
   a first pair of identical resistance ladders each having a plurality of resistive steps and representing a selected series of frames per second camera speeds,
   a first pair of conjointly operated connecting means, one of said pair connecting the top of said first resistance ladder to a selective step of one of said first pair of resistance ladders and the other one of said pair connecting the bottom of said first resistance ladder to the same selective step of the other one of said first pair of resistance ladders,
   a second pair of identical resistance ladders each having a plurality of resistive steps and representing a selected series of film speeds,
   a second pair of conjointly operated connecting means, one of said pair connecting the top of said one of said first pair of resistance ladders to a selected setting of one of said second pair of resistance ladders and the other one of said second pair of connecting means connecting the bottom of said other one of said first pair of resistance ladders to the same selected setting of the other of said second pair of resistance ladders, and
   means for connecting one end of one of said second pair of resistance ladders to one side of said voltage source and for connecting the other end of the other of said second resistance pair to the other side of said voltage source.

2. An exposure meter according to claim 1 wherein said second house side further comprises means having a predetermined resistance for selectively multiplicitively increasing the value of each of said camera speed settings by a predetermined amount.

3. An exposure meter according to claim 2 further comprising a first standard resistance of preselected value representing a standard value for said photo-conductive cell at a given illumination, means for removing said photoconductive cell from said one housing side and substituting said first standard resistance therefor.

4. An exposure meter according to claim 3, further comprising a second standard resistance of preselected value representing the cumulative resistance of one of said first and second pairs of resistance ladders and said multiplying means and means for removing said first and second pairs of resistance ladders and said multiplying means from said second house side and substituting said second standard resistance therefor.

5. An exposure meter according to claim 4 wherein said second house side further comprises variable resistor means for standardizing said second house side including said second standard resistance to said first house side including said first standard resistance.

6. An exposure meter according to claim 5, further comprising first means for stepping up the voltage of said first house side for step standardizing said first house side including said first standard resistance to said second house side including said first and second resistance pairs and said multiplying means.

7. An exposure meter according to claim 6 further comprising means for selectively stepping down the voltage of said first house side to compensate for a photoconductive cell having a lower series of resistance readings over the selected series of illumination ratings than the resistance readings for a nominal photoconductive cell.

8. An exposure meter according to claim 7, further comprising second means for selectively stepping up the voltage of said first house side to compensate for a photoconductive cell having a higher series of resistance readings over the selected series of candlepower ratings than the resistance readings for a standard photoelectric cell.

* * * * *